United States Patent [19]

Yang

[11] Patent Number: 5,513,040
[45] Date of Patent: Apr. 30, 1996

[54] OPTICAL DEVICE HAVING LOW VISUAL LIGHT TRANSMISSION AND LOW VISUAL LIGHT REFLECTION

[75] Inventor: Peter Y. Yang, San Diego, Calif.

[73] Assignee: Deposition Technologies, Inc., San Diego, Calif.

[21] Appl. No.: 332,922

[22] Filed: Nov. 1, 1994

[51] Int. Cl.⁶ .............................. G02B 1/10; G02B 5/28; B21D 39/00; C03C 27/04
[52] U.S. Cl. .......................... 359/585; 359/586; 428/622; 428/632
[58] Field of Search ..................................... 359/359, 360, 359/584, 585, 586, 589; 428/622, 632

[56] References Cited

U.S. PATENT DOCUMENTS

| | | | |
|---|---|---|---|
| 3,556,640 | 1/1971 | Austin | 359/585 |
| 4,045,125 | 8/1977 | Farges | 359/585 |
| 4,799,745 | 1/1989 | Meyer et al. | 359/360 |
| 4,978,181 | 12/1990 | Inanuma et al. | 359/360 |
| 5,071,206 | 12/1991 | Hood et al. | 359/360 |
| 5,306,547 | 4/1994 | Hood et al. | 359/360 |

FOREIGN PATENT DOCUMENTS 63-265625  11/1988  Japan ........................ 359/585

*Primary Examiner*—Martin Lerner
*Attorney, Agent, or Firm*—Juettner Pyle Lloyd & Piontek

[57] ABSTRACT

A solar control film having low visible light transmittance and low visible light reflectance is comprised of two or more transparent substrates each bearing a thin, transparent, discontinuous, incoherent film of metal having low visible light reflectance and a degree of visible light blocking capacity, the substrates being so assembled and laminated into a composite that the visible light blocking capacities of the metal films are effectively combined to provide a composite having low visible light transmittance. Performance characteristics are enhanced by providing on one or more of the substrates a transparent coating of high refractive index underlying the metal film. The material of high refractive index is preferably a synthetic high oxygen content oxide of bismuth, which facilitates efficient and economical production of the solar control film.

16 Claims, 6 Drawing Sheets

FIG. 5

OPTICAL DEVICE HAVING LOW VISUAL LIGHT TRANSMISSION AND LOW VISUAL LIGHT REFLECTION

FIELD OF THE INVENTION

The present invention relates to optical devices, such as solar energy control window films, having low visual light transmission and low visual light reflection, and to methods of making the same.

BACKGROUND

The glass tinting industry desires a class of solar energy control coatings or films with a visual light transmission (VLT) less than 50%, and preferably less than 30%. At the same time, the industry desires these coatings or films to have a visual light reflection (VLR) less than 15%, and preferably equal to or less than 10%.

With the metallized plastic films conventionally employed for solar energy control in the window glass industry, the visual light transmittance or VLT can be decreased by increasing the thickness of the metal layer on the film, but this results in an increase in the visual light reflectance or VLR. For example, typical metal coated solar films with a VLT of 25% have a VLR of 30 to 35% and more. Thus, the VLT and the VLR become competing interests without a middle of the road compromise acceptable to the industry. In general, at the present time, the VLT is set at an acceptable level, and the VLR remains higher than desired.

An alternate approach to the demands of the industry has been to utilize dyed plastic films or sheets, either alone or as a substrate for a metal film or layer. However, dyed films have very poor solar performance and the color fades with aging. Consequently, the dyed films have not provided a satisfactory solution to the demands of the industry.

Another attempt to reduce the VLR of low VLT metallized films has been to apply coatings of titanium oxide or indium tin oxide adjacent the film or layer of metal to control reflection within a narrow spectral band. According to classical optics, sandwiching of the metal film between layers of a material of high refractive index can boost visual transmission, that is, so-called induced transmission, and reduce reflection. In common practice, this requires 70 to 100 nanometer thick layers of titanium oxide or indium tin oxide, which are very slow to produce and difficult to control. As a result, this approach has proven too expensive to be practical, and even so, provides at best only a partial solution to the VLT/VLR dichotomy.

U.S. Pat. No. 4,799,745 (Reexamination Certificate B1 4799745) discloses an infrared reflecting film employing Fabry-Perot interference filters comprised of two or more transparent layers of metal, such as silver, gold, platinum, palladium, aluminum, copper, nickel and alloys thereof, separated by directly contiguous intervening dielectric spacer layers, which may suitably be the oxides of indium, tin, titanium, silicon, chromium and bismuth. Related U.S. Pat. No. 5,071,206, which issued on a continuation-in-part of patent 4,799,745, discloses a color corrected infrared reflecting film comprised of a substrate bearing seven directly contiguous alternating layers of dielectric and silver. While these films have low visual light reflectance, they require five to seven layers of material sputter deposited onto one another, which is expensive and not easy to accomplish. With decreasing visual light transmission, the task becomes more difficult.

Patent Cooperation Treaty international publication WO 94/04356 teaches that the reflectivity of a carbon based polymer sheet may be reduced by sputter-depositing onto the sheet a discontinuous dendritic layer of inorganic material having an index of refraction greater than that of the polymer. The inorganic material may be an oxide, nitride or oxynitride of a primary metal selected from tantalum, niobium, titanium, hafnium, tungsten and zirconium. The primary coating may be supplemented by an overcoat layer comprising an oxide, nitride or oxynitride of a secondary metal selected from indium, tin and zinc. When used as internal plastic surfaces in multi-pane window units, the coatings increase light transmission through the polymer film with minimal coloration and haze. Thus, while reflection is reduced, transmission is not.

Consequently, there remains in the industry a strong demand for development of an inexpensive class of coatings and/or coated films that will have both a low VLT and a low VLR.

SUMMARY OF THE INVENTION

The object of the present invention is to provide improved optical devices, especially improved solar energy control films, having both low visual light transmittance and low visual light reflectance, and a method for producing the same economically.

Another object of the invention is to provide improved solar energy control films and/or coatings that have good solar energy rejection characteristics, as well as low VLT and low VLR characteristics.

In accordance with the invention, these improved films and/or coatings are obtained through thin film optics technology, modern material sciences, and a fresh approach to the VLT/VLR dichotomy. More specifically, in contrast to prior art practices, the present invention first addresses reflectance and thereafter addresses transmission.

It is, in particular, a specific object of the invention, first, to develop an optical device or component which embodies some degree of visual light transmission control and which has exceptionally low visual light reflectance; and second, to combine two or more of the devices or components in such manner as to achieve the desired level of transmission control.

A first aspect of the invention resides in the use of very thin rather than thick layers or films of metals suitable for controlling transmission of light. Metals suitable for the purpose include gold, silver, nickel, chromium, nickel-chromium alloys and stainless steels. When very thin layers or films of these metals are magnetron cathode sputter deposited onto a substrate, the resulting film tends to be discontinuous, dendritic and incoherent. The metal does not form into a coherent, smooth surfaced, continuous layer. Due to surface irregularities in the film, the metal does not have a shiny or mirror-like reflective surface. Instead, light is scattered and/or absorbed, so that the metal film itself has a low VLR.

Because the metal film or coating is thin, it does not impart to the coated substrate the desired degree of visual light blocking effect, i.e., the VLT of the coated substrate is much greater than desired. In accordance with the approach provided by the present invention, the visual light blocking effect is increased and the VLT is decreased by combining two or more of the coated substrates into a composite film wherein the metal coated surfaces are internal surfaces in the composite structure and are optically decoupled so that the light blocking effects of the coatings are combined, i.e., added together, to produce the desired low level of VLT while maintaining the low VLR of the individual metal coated surfaces. Preferably, the metal surfaces are optically decoupled by intervening layers of adhesive employed for laminating the plurality of coated substrates into a unitary composite film.

Consequently, the invention provides a very inexpensive solar control film having a low VLT and a low VLR and comprised simply of a laminated assembly of two or more components or subunits each comprised of a substrate bearing a thin incoherent film of metal.

Further control over the reflectance, transmittance, and/or darkness of the film may be gained by incorporation into one or more of the subunits of additional materials that will decrease the transmittance and/or reflectance or increase the visual light absorbency of the composite film.

As above noted, classical optics suggest that sandwiching the metal layer between layers of material having a high refractive index would further decrease the reflectance of the metal. Accordingly, in carrying out the novel approach proposed by this invention, one or more coatings of high refractive index should preferably be used in conjunction with the low VLR metal film above described. While materials heretofore used for the purpose, e.g., titanium oxide, may of course continue to be used to reduce reflectance, the present invention provides a second novel aspect of particular import.

The second aspect of the present invention resides in the use of synthesized high oxygen content oxides of bismuth ($BiO_x$) as the preferred material of high refractive index, to produce a low reflectance device or component of excellent quality and outstanding performance, that is economical to produce.

In its second aspect, the invention is based on the discovery that when bismuth is magnetron cathode sputtered reactively with oxygen in a controlled oxygen partial pressure atmosphere, such that the atomic ratio of the oxygen to the bismuth in a $BiO_x$ film deposited on or adjacent a thin optical film of metal is within the range of about 1.7 to about 2.5, i.e., $BiO_x$ (x=1.7–2.5), the visual light reflectance of the multilayer film is greatly reduced.

The reactively sputtered synthesized $BiO_x$ (x=1.7–2.5) film has a high optical refractive index of 2.5 to 2.7 in the visual spectrum, which is comparable to titanium oxide ($TiO_2$), and substantially higher than other visually transparent materials. In addition, the dynamic deposition rate of the synthesized $BiO_x$ is far greater than that of titanium oxide, and much more readily controlled, thereby to provide high refractive index coatings of exceptionally high quality that can be produced easily, quickly and economically.

The combination of a substrate, a layer of material of high refractive index, and a very thin discontinuous or incoherent film of metal provides an optical device, component or subunit that is very economical to produce, and that has an extremely low VLR and a degree of VLT control.

The third aspect of the invention then resides in combining two or more of these subunits or components with one another in such manner that the VLT control factors of the individual components are added together or combined in order to obtain the desired level of VLT. The combining of the components is preferably achieved by laminating and bonding the same together with intervening layers of adhesive so as to define independent interference filters that are separated by, and thus optically decoupled by, the intervening adhesive layers. In a two unit assembly, each thin film of metal will provide about 50% of the visual light transmission control, and in a three unit assembly, each metal film will provide about ⅓ of the visual light transmission control.

Thus, by combining two or more subunits each comprised of a thin metal film of low reflectance and a film or layer of highly refractive material, especially $BiO_x$ (x=1.7–2.5), the present invention provides solar energy control films and/or coatings that have good solar energy rejection characteristics, low visual light reflectance and low visual light transmittance.

The invention also has as an object the provision of a method for mass producing the improved solar films and coatings very efficiently and economically.

In accordance with a preferred embodiment of the method of the invention, a conventional transparent film or sheet of substrate material is first passed through a magnetron cathode sputtering station wherein a layer of material of high refractive index is sputter deposited onto the substrate. It is preferred that the material of high refractive index comprise bismuth sputtered reactively with oxygen in a controlled oxygen partial pressure atmosphere such that a synthesized high oxygen content bismuth oxide having an atomic ratio of oxygen to bismuth within the range of about 1.7 to about 2.5 is deposited on the substrate. The dynamic deposition rate of the synthesized $BiO_x$ is very high, and a coating or film is thus applied to the substrate easily, quickly and economically. The coated substrate is then passed through a magnetron cathode sputtering station where a very thin metal film is quickly and economically sputter deposited onto the coating of high refractive index.

Sputter deposition of the two coatings or films may be performed by passing the substrate twice through a single station sputtering apparatus or by passing the substrate through an apparatus having two or more sputtering stations arranged in sequence along the path of substrate travel. The substrate may comprise sheets or a continuous web of glass or plastic. In any event, the substrate is coated with a thin layer of high refractive index and a thin incoherent film of metal very efficiently and expeditiously, thereby to provide a solar energy control device or component that is economical and has greatly enhanced performance characteristics.

The resultant device or component has very low visual light reflectance and a degree of visual light transmission depending primarily upon the nature and thickness of the metal film. By laminating two or more of the devices or components to one another, substantially any desired level of visual light transmission control can readily be attained.

Further variations in optical performance may be achieved by the use of different materials for the plurality of coatings in a composite end product.

The invention thus provides greatly improved low VLT and low VLR optical devices and a process for the efficient and economical mass production of such devices.

These and other objects and advantages of the invention will become apparent from the following detailed description, as considered in conjunction with the accompanying drawings.

DETAILED DESCRIPTION

The following is a detailed description of preferred embodiments of the invention presently deemed by the inventor to be the best mode of carrying out his invention.

As used in this specification and the appended claims, the following terms have defined meanings:

"Visible radiation" or "light" means electromagnetic radiation having a wavelength of from 380 nanometers to 750 nanometers. (CIE Standard)

"Transparent" means having the property of transmitting visual radiation.

"Visible light transmission", "visual light transmittance" and the acronym "VLT" mean the percentage of visual radiation or light that is transmitted through a transparent optical device, e.g., a window.

"Visible light reflection", "visual light reflectance" and the acronym "VLR" mean the percentage of visual radiation or light that is reflected from an optical device.

"Visible light absorption", "visual light absorptance" and the acronym "VLA" mean the percentage of visual radiation or light that is absorbed by an optical device. In general, the sum of the VLT, VLR and VLA should equal 100%.

"SC" or "Shading Coefficient" is an architectural measure of the efficiency of a window system's solar control capability. It is expressed as the ratio of the solar heat gain through any given window system to the solar heat gain that would occur under the same conditions if the window were made with clear, unshaded, double strength window glass. The lower the shading coefficient, the greater the capacity of the window to control solar energy. (ASHRAE Standard Calculation Method). The clear glass is assigned a value of 1.00. An SC value below 1.00 indicates better heat rejection than single pane clear glass.

"Incoherent" as applied to a metal layer or film means lacking coherence, lacking orderly continuity or arrangement, consisting of discrete elements, inconsistent, not homogeneous.

"Sputter deposit" or "sputter-deposited" refers to the process or the product of the process in which a layer of material is deposited onto a substrate by the use of magnetron sputtering apparatus.

Figure 1:
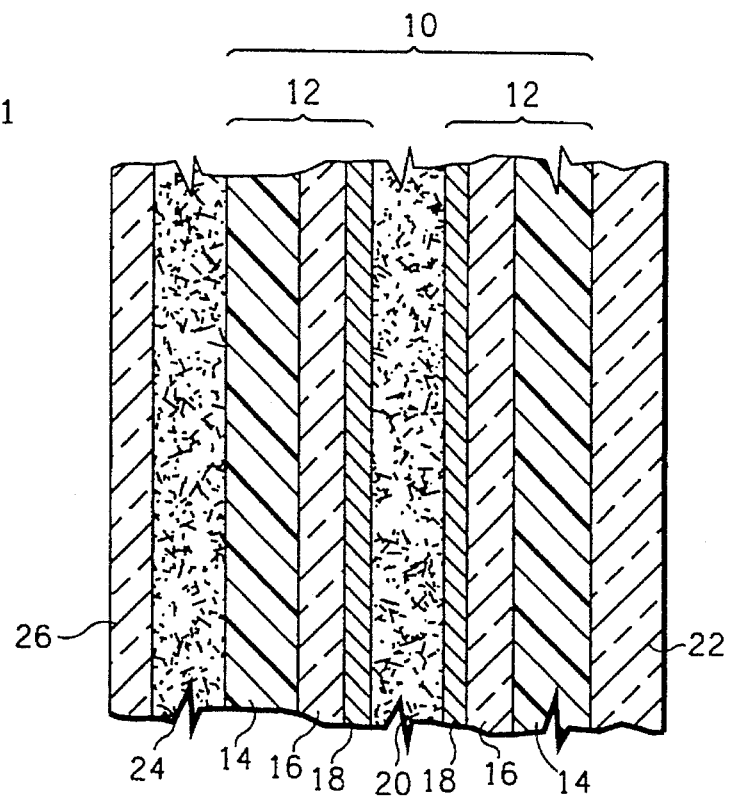
FIG. 1 is a schematic representation, in cross-section and on a greatly magnified scale, of a preferred embodiment of a solar control film provided in accordance with the invention and comprised of two of the low reflectance devices or components of the invention.

FIG. 1 illustrates schematically, in fragmentary cross section on a greatly magnified scale, a preferred embodiment of a composite solar energy control film provided in accordance with the invention. In FIG. 1, the composite film, which is indicated at 10, is comprised of two optical subunits, components or devices 12 each comprised of a substrate 14, a layer of material of high refractive index 16 and a thin, discontinuous, incoherent, dendritic layer of metal 18.

The substrate 14 may comprise any of the transparent supporting materials conventionally used for solar control film, particularly flexible polymer films supplied in web form. The preferred polymer is customarily a polyethylenetherphthalate (PET) film having a thickness from about 1 to 2 mils up to about 50 mils. The refractive index of such films customarily falls within the range of 1.4 to 1.7.

The layer 16 is formed of a material having a refractive index greater than that of the substrate 14, and preferably having a refractive index of 2.0 or greater. Also, it is preferred that the material be one that can be sputter deposited onto the substrate with relative ease. Suitable materials include the conventional oxides of chromium (chromic oxide, dioxide and trioxide, $CrO$, $CrO_2$, $CrO_3$), niobium ($Nb_2O_5$) and titanium ($TiO_2$) and silicon nitride ($Si_3N_4$), all of which may be directly or reactively sputter deposited onto the substrate 14. However, as will subsequently be described in more detail, the preferred material for the layer 16 of high refractive index is a synthesized high oxygen content oxide of bismuth having an atomic ratio (A/R) of oxygen to bismuth from about 1.7 to about 2.5. The conventional oxide of bismuth, $Bi_2O_3$, has far too great absorbency in the visual spectrum (VLA) to be considered as an optical material, and certainly not as a candidate for the layer 16. By sputtering bismuth in a controlled oxygen partial pressure atmosphere, a synthetic high oxygen content oxide of bismuth can be formed which is not highly absorbent and which has a refractive index of 2.4 to 2.7.

The thickness of the layer 16 of material of high refractive index will vary depending upon the desired VLT of the composite film 10 and the thickness of and the metal selected for the layer 18, all of which are interrelated. In general, for composite films having a VLT equal to or greater than 20–25%, the thickness of the layer 16 will be in the order of from about 0.1 to about 10 nanometers (nm), and for composite films having a VLT equal to or less than 20–25% will be in the order of from about 10 to about 50 nm.

The formation of the metal layer 18 in each optical subunit or component 12 of the composite film 10 is very critical to the successful practice of the invention. The reflectance or VLR of each layer 18 must be nearly the same as or reasonably close to the desired VLR of the composite film 10, and must at the same time provide a reasonable level of visual light blocking effect so that a reasonably small number of subunits will together reduce the VLT of the composite film to the desired percent VLT. In order to achieve these conflicting goals, each metal layer 18 must be a incoherent film capable of scattering, diffusing and/or absorbing visual light, but having sufficient thickness to partially block or reduce the transmission of visual light through the subunit 12. In accordance with the invention, this is achieved by sputter deposition of a thin layer of a selected metal.

Sputter deposition of a very thin layer or coating of metal results in the metal being deposited in spaced clusters, much like individual rocks or the trees in a forest. The film or coating is incoherent and may be said to be dendritic or oolitic. The metal does not flow into a coherent, smooth-surfaced, highly reflective layer, as would occur if deposition were to continue beyond a certain thickness. Generally speaking, the thickness of the metal layer should not exceed in the order of about 20 nm, and should preferably fall within the range of from about 1 to about 20 nm, and even more preferably within the range of 2 to 5 nm, depending on the VLT desired or specified. For the low reflectance films contemplated by the invention, the coating should be sufficiently thin and irregular that the VLR of each metal layer 18 does not exceed in the order of about 12%.

The metal employed is preferably selected from the group consisting of gold, silver, chromium, nickel, and alloys thereof, and stainless steel. The selection of the materials of the layers 16 and 18 will determine the color of the composite film. For example, silver with an appropriate undercoating will tend to produce a blue colored film while stainless steel will tend to produce a grey film. Other variations may be obtained by making one of the subunits or components 12 from materials different from those used in the other subunit or component 12, which is permissable inasmuch as the subunits are physically isolated and optically decoupled from one another in the composite film 10.

As shown in FIG. 1, the two subunits or optical components 12 are laminated together with their metal coated surfaces juxtaposed to one another and spaced apart by an intervening transparent layer 20 of a conventional laminating adhesive. Consequently, in the composite structure, the visual light blocking capacities of the two subunits 12 are cumulative and together can reduce the VLT of the composite film to a desired level. Moreover, the layers 16 of materials of high refractive index may be employed to supplement the incoherent metal films 18 to further reduce transmittance and/or reflectance and/or to increase absorptance. Thus, the refractive layers 16 and the metal layers 18 are mutually and variably interdependent on the desired result, i.e., the specified VLT, VLR, color and darkness of the composite film 10.

In order to complete the product for use in the window film industry, the exposed surface of one of the substrates 14 is coated with a scratch and wear resistant hard coat 22 and the exposed surface of the other substrate 14 is coated with a pressure-sensitive adhesive 24 to facilitate lamination of the composite film to a window, glazing unit, or the like. Pending use of the film, the pressure sensitive adhesive 24 is preserved and protected by the customary release sheet 26. As is customary in the art, ultra-violet absorption additives and the like are preferably incorporated in the pressure sensitive adhesive 24.

Figure 2:
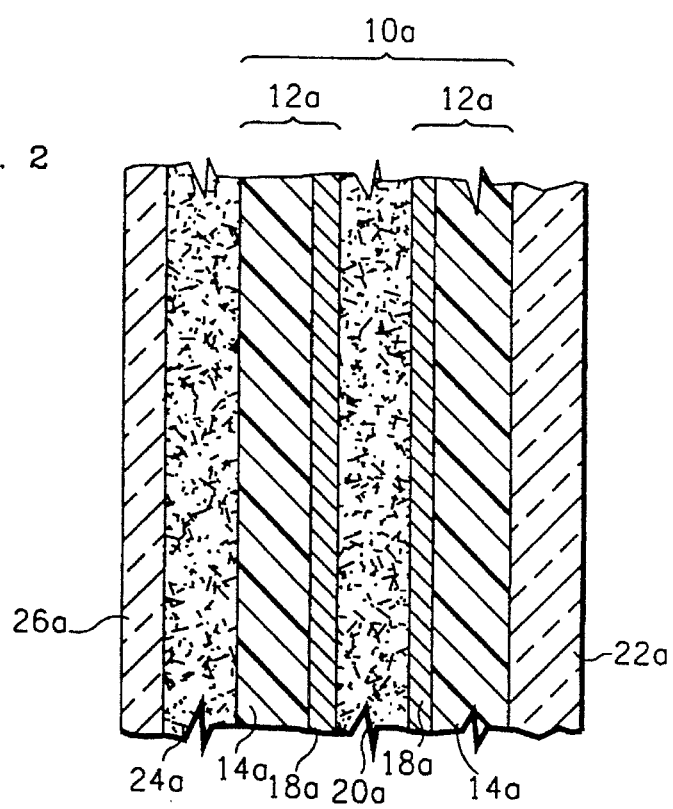
FIG. 2 is a similar schematic representation of an alternative embodiment of the composite structure of FIG. 1.

A simplified alternative to the composite film of FIG. 1 is illustrated in FIG. 2. While the FIG. 2 alternative does not provide the same capacity for control of VLT and VLR as does the structure of FIG. 1, it nevertheless comprises a practical and less expensive film having reasonably low VLT and VLR control characteristics for applications less demanding than those for which the structure of FIG. 1 is designed. Due to the similarity of the two structures, elements in FIG. 2 that correspond to or are the same as corresponding elements in FIG. 1 are indicated by the same reference numeral with the added suffix "a". As will be observed, the difference between the two structures resides in the omission from FIG. 2 of the layers 16 of material of high refractive index.

For solar film applications specifying a relatively high visual light transmittance (say 25–50%), a reasonably low but not extremely low visual light reflectance (say 13%), and not requiring a dark colored film, the simplified composite structure of FIG. 2 will serve admirably well.

Metal films which have the requisite visual light blocking effect can readily be sputter deposited in a sufficiently thin and irregular layer as to provide a VLR as low as 9–10%. As a specific example, a solar control film constructed as shown in FIG. 2 and having two films 18a of chromium each sputter deposited on the respective substrate 14a at a thickness of 2.5 nm produced a composite film having a VLT of 45% and a VLR of 9%. In another example, the thickness of each chromium layer was increased to 3.5 nm to produce a composite film having a VLT of 25% and a VLR of 13%. In comparison, conventional solar films having a single layer of metal and providing a VLT of 25% will have a VLR of 30% or more.

Thus, whether in the form of the more complex structure of FIG. 1 or the simplified construction of FIG. 2, the present invention provides significant advantages over the art in terms of low visual light reflection and low cost of manufacture. Moreover, when the specifications become somewhat more stringent then above discussed, resort may be had to a hybrid of the structures of FIGS. 1 and 2, i.e., a structure wherein the two control elements 12/12a are comprised of one of the more complex filters 12 of FIG. 1 and one of the simplified elements 12a of FIG. 2.

Figure 3:
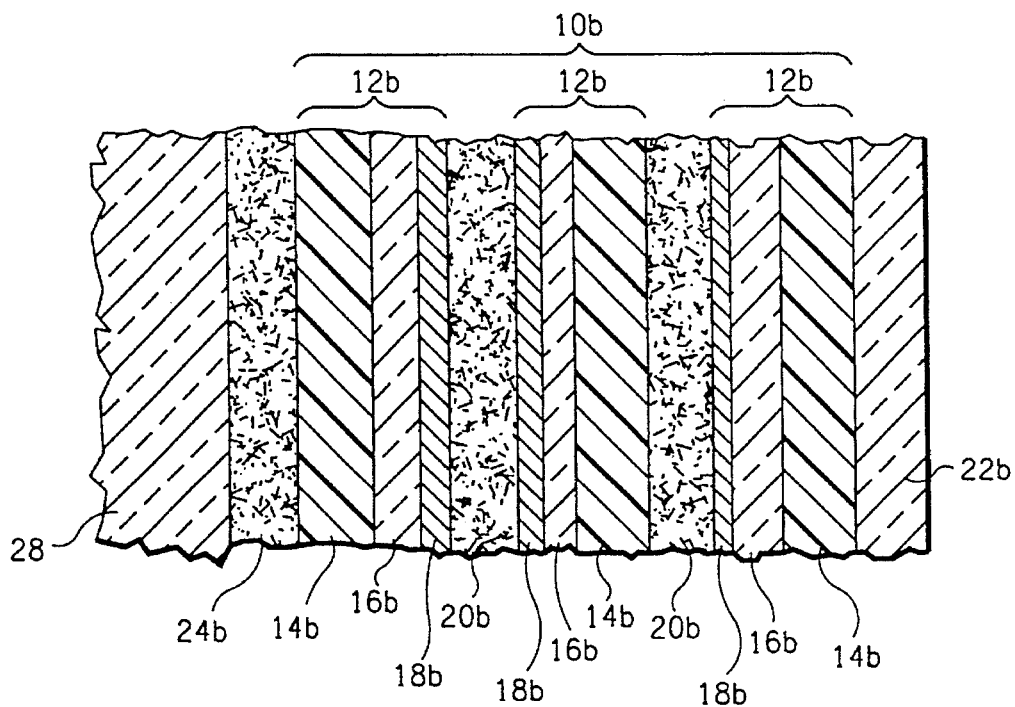
FIG. 3 is a similar schematic representation of a preferred embodiment of a solar control film provided in accordance with the invention and comprised of three of the low reflectance devices or components of the invention; the film being shown as adhered to a pane of glass or a window.
Figure 4:
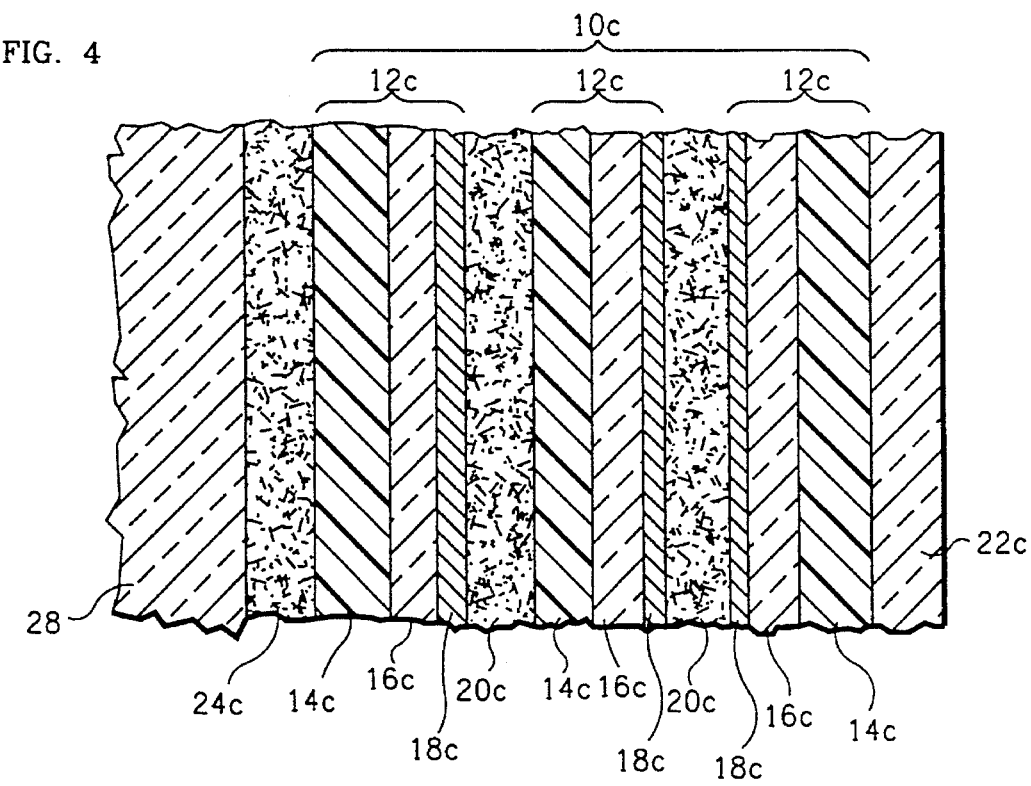
FIG. 4 is a similar schematic representation of an alternative embodiment of the composite structure of FIG. 3.

When the specifications become even more stringent, resort should be had to the construction of FIGS. 3 and 4, wherein the solar films are illustrated as adhered to a pane of glass 28. In the structures of FIGS. 3 and 4, visual light transmission and visual light reflectance are reduced to extremely low levels by use of three of the control elements described in conjunction with FIG. 1. Because of the similarity and substantial identity of the components, the same reference numerals as used in FIG. 1 are used in FIG. 3 with the added suffix b, and in FIG. 4 with the added suffix c.

Referring to FIG. 3, the solar control film of the invention, which is indicated at 10b, is comprised of three subunits 12b, each of which in turn is comprised of a polymer substrate 14b, a coating of high refractive index 16b and a thin incoherent metal film 18b. The three subunits are assembled in such relationship that the three metal surfaces 18b are internal to the composite assembly 10b and are laminated to one another by intervening layers of adhesive 20b. The thickness of each layer of adhesive is typically in the order of from about 0.5 to about 5.0 microns. In essence, the assembly is the same as that in FIG. 1 with a third subunit 12b sandwiched between the original two subunits.

By using three or even more thin films 18b of metal, the VLT of the composite film can be reduced to very low levels, e.g., 20% or less, and yet the individual films 18b can be maintained sufficiently thin and irregular, i.e., dendritic, so as to provide a very low level of VLR, e.g., 10% or less. The layers 16b of high refractive index also assist in achieving a very low VLR and in imparting darkness to the film whenever darkness is a desired characteristic.

A layer of pressure-sensitive adhesive 24b is provided on one of the outer surfaces 14b of the composite film for adhering the same to a window 28 and a scratch and wear resistant hard coat 22b is provided on the other outer surface 14b of the composite to protect the same from damage, e.g., when the window is washed.

The composite film 10b will normally be adhered to the interior surface or room side of the window 28. As shown in FIGS. 3 and 4, the right hand surface of the window is the interior or room side to which the film is adhered and the left hand surface faces the out of doors. In FIG. 3, the metal layer 18b of the internal or central subunit 12b faces the pane of glass or window 28, which results in equal levels of reflectance on both the room side of the window and the exterior of the window, i.e., VLR (glass)=VLR (room).

The composite film 10c shown in FIG. 4 is the same as the composite film 10b of FIG. 3 except that the internal or central subunit 12c is reversed, i.e., so that its metal surface 18c faces the interior of the room. This results in lowering the VLR at the glass side of the assembly and slightly increasing the VLR on the room side, i.e., VLR (glass)<VLR (room). Accordingly, by orienting the subunits as shown in FIG. 4, the external reflectance, VLR (glass), can be reduced by a few percentage points in comparison to the external reflectance of the assembly of FIG. 3.

As above discussed in conjunction with the FIG. 2 modification of the solar film of FIG. 1, one, two or all the high refractive index layers 16b and 16c of FIGS. 3 and 4 may be omitted when the specifications for the end product will permit their omission.

In order to expedite a comparative evaluation of the solar control films of the invention with existing commercial solar control films, samples were prepared utilizing the same PET substrate as used for the commercial films and sputter coating the same with a thin discontinuous layer of chromium and omitting the oxide or high refractive index precoat. Sheets of the chromium coated films were then laminated together with adhesive to form specimen composite films comprised of two substrates and two layers of chromium as shown in FIG. 2 (hereinafter referred to as DCr2), and three substrates and three layers of chromium as apparent from FIG. 3 (herein referred to as TCr). One specimen was also prepared in accordance with FIG. 1 (herein referred to as DCr1). These films were then tested for their VLR and VLA characteristics and compared to existing commercial solar films.

The assignee of the present invention, Deposition Technologies, Inc. of San Diego, Calif., produces a variety of solar control films comprised of a polymer substrate coated with a single layer of metal, namely, titanium (Ti), stainless steel (SS), or inconel or nichrome (NiCr), and also a plural layer film sold under the trademark Solar Bronze (SB) which is comprised of a polymer substrate, a thin layer of stainless steel, a thin layer of copper and a thin layer of stainless steel. These films are each sold in a number of grades having different visual light transmitting or blocking characteristics. Typically, the grades are identified by their light blocking efficiency, i.e., a Solar Bronze film having a visual light transmitting capacity of 25% and a visual light blocking capacity of 75% is identified as "75SB". Similarly, "75Ti" and "75SS" respectively identify a titanium coated film and a stainless steel coated film each having a visual light blocking capacity of 75% and a visual light transmitting capacity of 25%.

For purposes of differentiation during the period of research, development and experimentation, the solar films of the invention are being oppositely designated, i.e., the two digit numeral identifies the light transmitting capacity not the blocking capacity. Thus, a "DCr2-45" film is one constructed in accordance with FIG. 2 and having a VLT of 45%. Similarly, a "TCr-30" film is one having three thin discontinuous layers of chromium (without an oxide precoat) and having a VLT of 30%.

The test results clearly establish the efficacy of the films of the invention in reducing VLR, as is shown by the following comparisons:

| Film Type | VLT | VLR | VLA | SC |
|---|---|---|---|---|
| SB50 | 45 | 19 | 36 | .46 |
| SS50 | 50 | 14 | 36 | .67 |
| Ti50 | 49 | 15 | 35 | .64 |
| NiCr50 | 44 | 15 | 41 | .59 |
| DCr2-45 | 44 | 9 | 47 | .66 |
| SB75 | 22 | 35 | 44 | .27 |
| SS75 | 23 | 30 | 48 | .41 |
| Ti75 | 23 | 30 | 48 | .41 |
| NiCr75 | 20 | 31 | 49 | .37 |
| DCr2-25 | 23 | 13 | 64 | .52 |
| DCr1-20 | 20 | 12 | 68 | |
| TCr3O | 30 | 10.5 | 59 | .56 |
| TCr2O | 20 | 10.5 | 69 | .49 |

Figure 5:
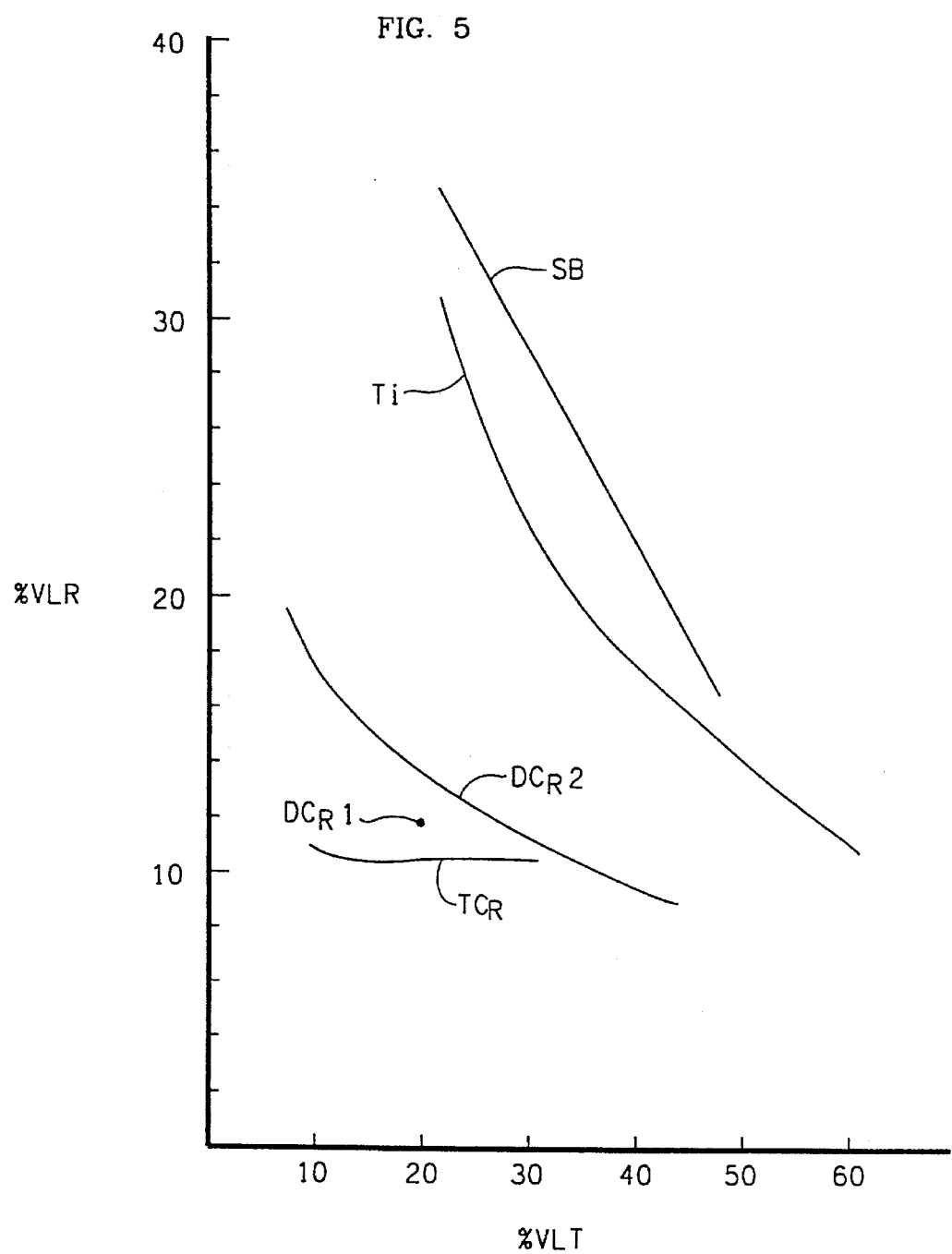
FIG. 5 comprises a graphic comparison of characteristic transmission and reflection spectra for the films of the invention and conventional commercially available solar control films.
Figure 6:
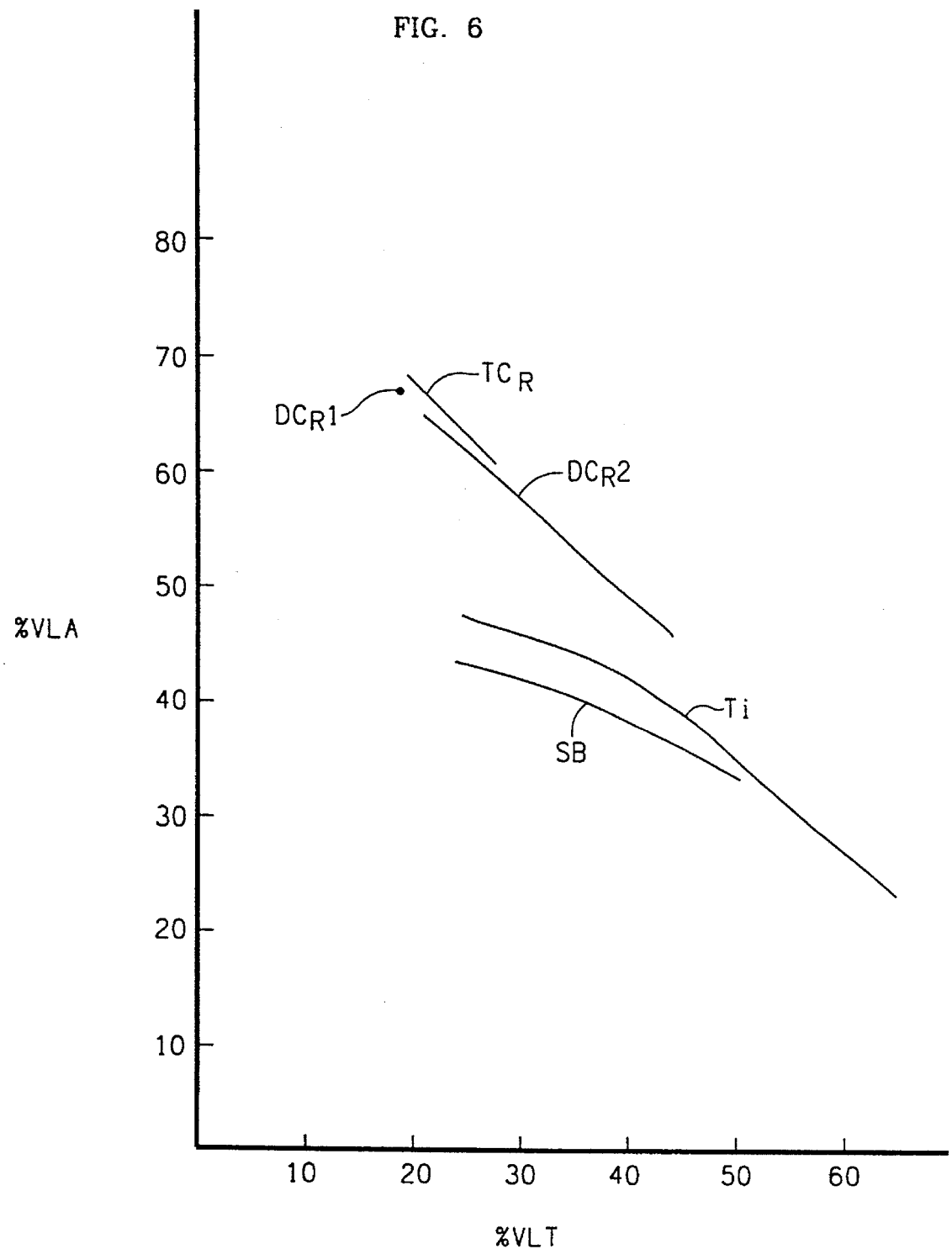
FIG. 6 is a graphic comparison of the transmission and absorption characteristics of the films of the invention and conventional commercially available films.

The efficacy of the invention is also demonstrated by the graphic illustrations of FIGS. 5 and 6 which respectively compare the visual light reflectance (VLR) and visual light absorption (VLA) of several solar films at differing levels of visual light transmission (VLT). The graphs illustrate the results of the tests on the solar films of the invention comprised of three layers or films of chromium, "TCr", those comprised of two layers or films of chromium per the disclosure of FIG. 2, "DCr2" and the single film comprised of two, layers of chromium per the disclosure of FIG. 1, "DCr1", and compare the same to one another and the VLR and VLA of the above referenced titanium films, "Ti", and Solar Bronze films, "SB". The curves for the stainless steel and nickel/chrome commercial films are very similar to the "Ti" curves and have therefore been omitted from the graphs for the sake of clarity.

As illustrated by the graphs, the solar films of the invention have far less reflectance and far greater absorption than the commercial films. The graphs also illustrate the reduction in VLR that can be achieved by use of three metal layers rather than two, and the further reduction that can be achieved by incorporation of the layers of high refractive index.

As is also revealed by the foregoing tables of data, the shielding coefficient "SC" of the solar films of the invention, even though determined solely from experimental samples, is maintained at a very respectable level in relation to the commercial films. Further development of the layers of material of high refractive index will still further improve the shielding coefficient.

In addition to providing greatly improved performance characteristics, the solar films of the invention can be produced very efficiently and economically using conventional magnetron sputtering apparatus and conventional film laminating equipment. The sputtering apparatus is used to produce the solar control subunits 12, 12a, 12b and 12c, and the subunits are then assembled and laminated together in any of the orientations previously described.

Figure 7:
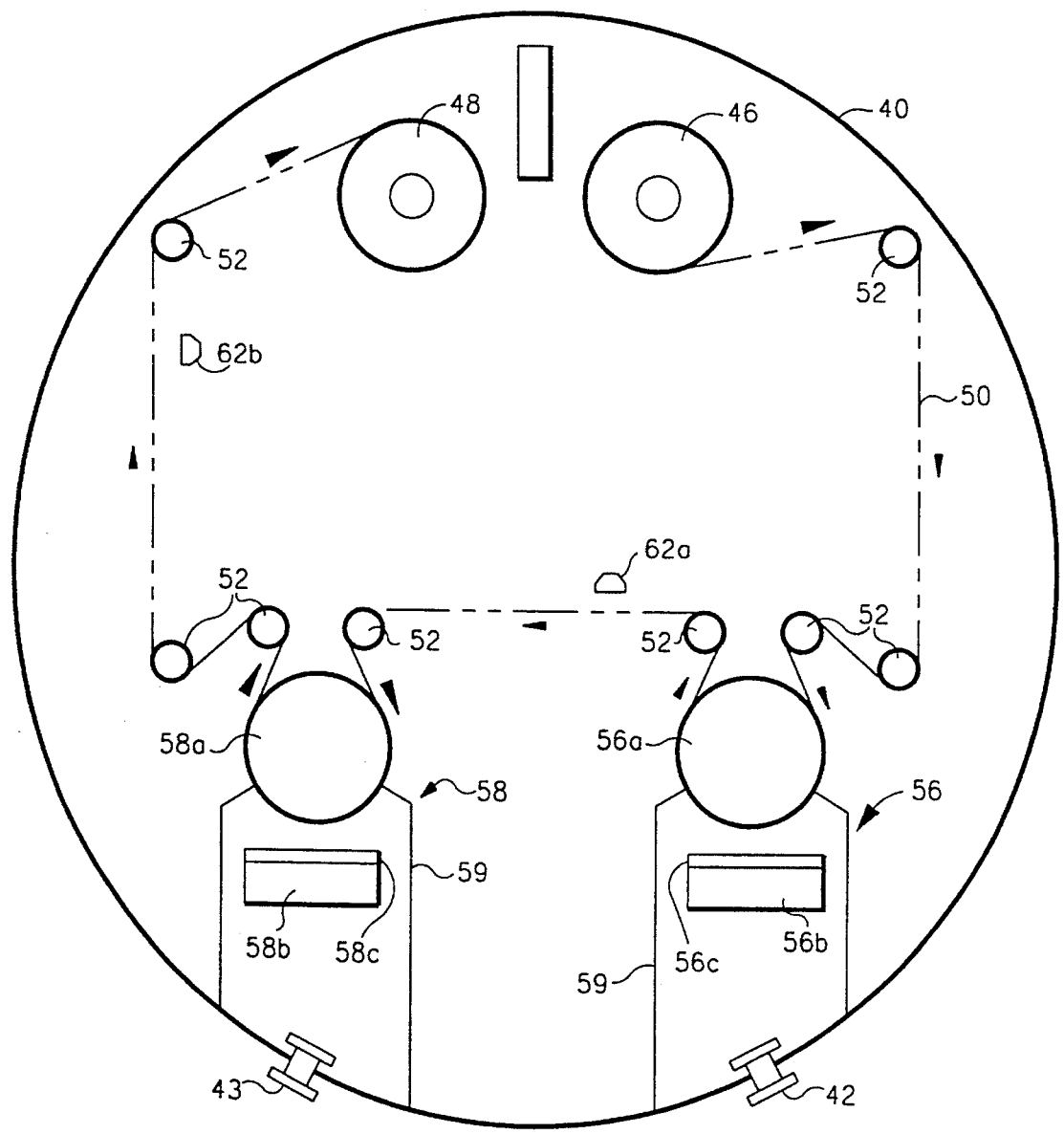
FIG. 7 is a schematic illustration of an apparatus for producing the low reflectance devices or components of the invention.

One form of apparatus suitable for sputter formation of the subunits is illustrated schematically in FIG. 7.

The apparatus is comprised of a vacuum chamber 40 equipped with means (not shown) for evacuating the chamber and means 42 and 43 for introducing into the chamber, or selected portions of the chamber, an inert gas, such as argon, and/or a gas such as oxygen to be reacted with a target material for depositing a reacted coating on the web, e.g., an oxide of the target material. The chamber is provided with an unwind reel 46 for receiving a roll of continuous web substrate material intended to be coated and a wind-up reel 48 for winding up the web of substrate material after it has been coated. The substrate web may comprise any material customarily used in sputtering operations, e.g., a polyester such as PET. As indicated by the dot-dash line, the web 50 is guided by a plurality of guide rollers 52 into and through at least one and preferably two web coating stations. In the illustrated apparatus, the coating stations include, in sequence in the direction of web travel, a first sputter deposition station 56 and a second sputter deposition station 58.

A variable speed web drive system (not shown) is provided to transport the web past the coating stations at a preselected speed, depending upon the coating characteristic desired. Typically, the whole roll of web material is coated and then removed from the chamber.

The two deposition stations 56 and 58 are preferably of the same construction and comprise, respectively, an internally chilled rotatable drum 56a, 58a of relatively large diameter for supporting and cooling the web and one or more magnetron cathodes 56b, 58b for sputter depositing a coating onto the web. Each cathode bears a target 56c, 58c of material to be subjected to ion bombardment for deposition onto the web 50.

For practice of the present invention, the two deposition stations are substantially enclosed and isolated from one another by appropriate partitions and/or baffles 59 so that respectively different sputtering operations can be carried out at the two stations, but all in the same vacuum chamber and all in a single pass of the web. In the preferred practice of the invention, the first station 56 is used to deposit onto the substrate the layer 16, 16b, or 16c of material of high refractive index and the second station 58 is used to deposit the thin, discontinuous film 18, 18a, 18b or 18c of metal, thereby to form a subunit 12, 12a, 12b or 12c in a single pass of the substrate from the unwind reel 46 to the wind-up reel 48.

Optical monitors 62a, 62b are provided downstream from each of the stations 56, 58 to monitor each of the coating operations and to ensure the proper thickness and composition of the coatings on the substrate.

As will be appreciated from the foregoing description, the material to be deposited at the second station 58 is a very thin discontinuous film of a metal or metal alloy, preferably gold, silver, nickel and chromium and alloys of the same, and stainless steel. Sputtering of these metals is very straight forward and readily and quickly achieved, particularly in view of the thinness of the film, i.e., 1–20 nm. The metal is preferably sputtered in an inert gas partial pressure atmosphere introduced into the substantially enclosed station 58 via the inlet 43.

The materials of high refractive index customarily employed in optical films are slower and more difficult to deposit, especially titanium oxide which is the material of highest index. In order to enhance the rate of deposition of the oxide to keep pace with the rate of deposition of the metal film, it may prove necessary to add more magnetron cathodes at station 56 and/or to add another oxide deposition station intermediate the stations 56 and 58. As is known, the compound of high refractive index may itself comprise the target 56c, or a target of the metal per se may be reactively sputtered in the presence of a partial pressure atmosphere of reactive gas, e.g. oxygen and/or nitrogen, introduced to the station(s) 56 via the inlet 42. Even so, because the deposition of $TiO_2$ onto a substrate is such a slow and tedious process and the resultant product is so expensive, economies of production may dictate use of a different oxide or nitride, even though the refractive index is significantly less than desired.

Bismuth oxide $Bi_2O_3$, though referenced in the literature for use in the far infrared range, is not considered an optical material in the visual range because it is highly absorbing in the visual spectrum, and therefore has not found application in the commercial solar film market.

The present invention is predicated in part upon the discovery that formation of a synthesized $BiO_x$ having a high level of oxidation (x=>1.7) produces a thin film that is not highly absorbing, and that provides a very high index of refraction comparable to that of $TiO_2$. More importantly, in the context of the process of the invention, the synthetic $BiO_x$ has a rate of deposition that is 25 or more times faster than that of $TiO_2$, thereby eliminating the economic impediment of $TiO_2$ and producing a better performing and more acceptable product.

Deposition of the $BiO_x$ film may be accomplished by reactive sputter deposition, actuated reactive evaporation deposition and vacuum arcing deposition, but reactive sputter deposition, as illustrated in FIG. 7, is presently preferred. Specifically, the target 56c is comprised of bismuth and is sputtered within a partial pressure atmosphere of oxygen, the oxygen partial pressure being variable to produce a layer of synthetic bismuth oxide having an atomic ratio of oxygen to bismuth of from at least 1.7 up to about 2.5, i.e., $BiO_x$ (x=1.7–2.5).

The thickness of the synthesized $BiO_x$ (x=1.7–2.5) film deposited on the substrate 50 may be varied from about 0.1 to about 50 nm (10–500 Å) depending upon the performance characteristics desired. The recommended thickness range is from 0.1 to 10 nm for solar films having a VLT=>35%, and from 10–50 nm for solar films having a VLT=<35%. The rate of production will generally vary from about 20 feet per minute (fpm) for thicker films up to about 50 fpm for thinner films. For most applications contemplated by the present invention, a film thickness of about 40 nm applied at a substrate speed of about 50 fpm will produce a very acceptable product.

Figure 8:
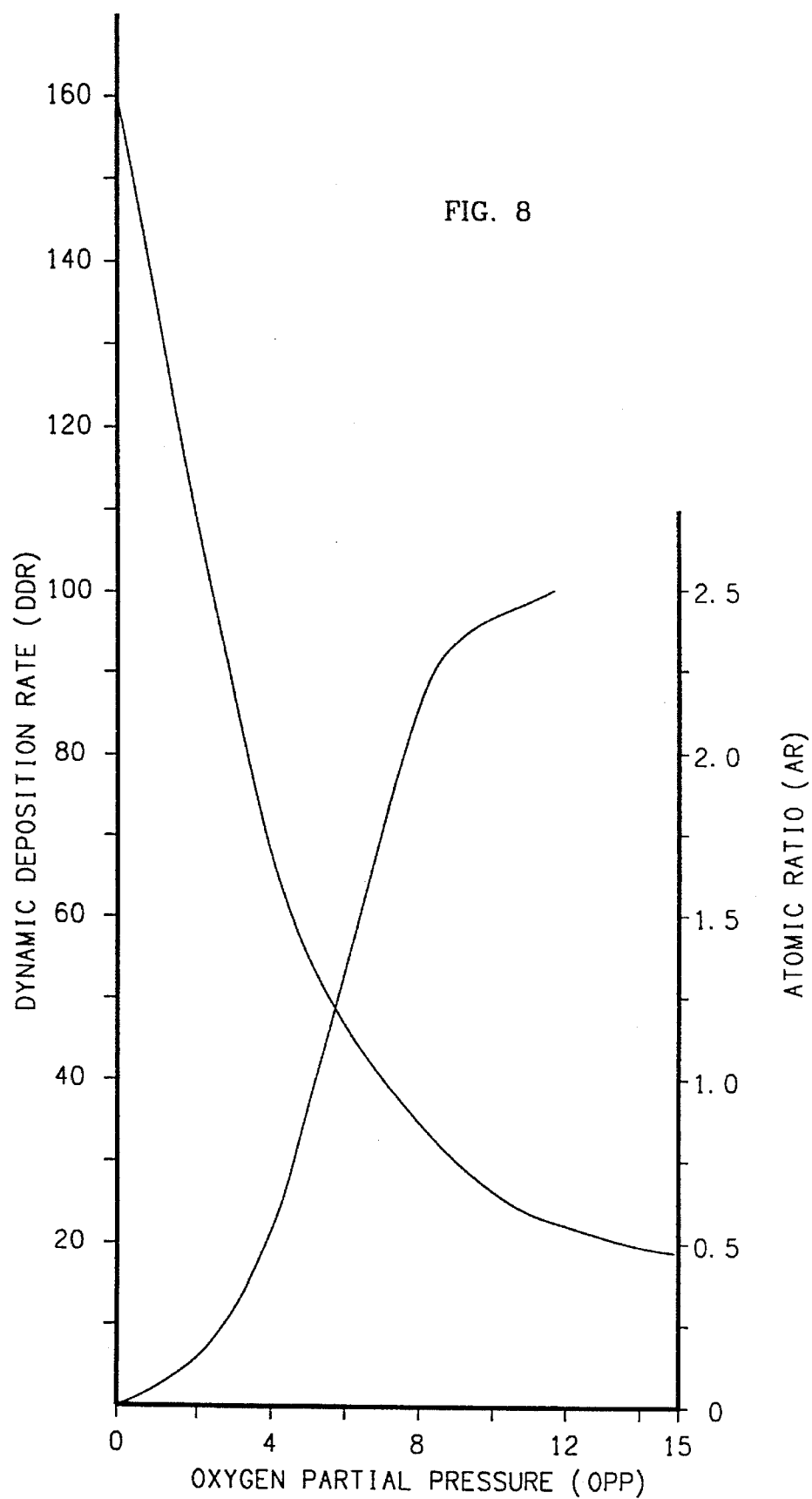
FIG. 8 is a graphic illustration correlating the dynamic deposition rates and the atomic ratios of high oxygen content oxides of bismuth at progressively increasing oxygen partial pressures for the reactive sputtering of bismuth.

However, the desired extent of oxidation of the bismuth will also enter into the production equation. FIG. 8 comprises a graphic correlation of the rate of reactive sputter deposition of synthesized oxides of bismuth, $BiO_x$, the atomic ratio of oxygen to bismuth in the oxide, and the oxygen partial pressure within the sputter deposition vacuum chamber. In FIG. 8, the oxygen partial pressure (OPP) is plotted along the abscissa, the dynamic deposition rate (DDR) along the left hand ordinate and the atomic ratio (AR) along the right hand ordinate. The descending curve comprises the DDR and the ascending curve the AR. The DDR was calculated from two test runs. The AR was determined by Helium Ion Beam Rutherford Back Scattering measurements and Auger Electron Spectroscopy profiles, calibrated against commercial bulk $Bi_2O_3$. For reasons not presently known, Auger profiles have consistently yielded higher AR values than Rutherford Back Scattering measurements, especially at higher AR values. Nevertheless, it is noted as a general observation that as the OPP increases, the AR rises and the film becomes clear when the AR equals or exceeds 1.7.

As graphically portrayed in FIG. 8, $BiO_x$ with an AR of 1.8 may be deposited at an oxygen partial pressure of about 7.5 E-5T ($7.5 \times 10^{-5}$ Torr.) and a DDR of about 3.5 nm×cm$^{}$2/j (thickness in nm times area in sq. cm. divided by energy in Joules); and $BiO_x$ with an AR of 2.5 may be produced at an OPP of 12E-5T and a DDR of about 2.5 nm×cm$^{}$2/j. In contrast, the DDR for reactive sputtering of $TiO_2$ is typically about 0.1 nm× cm$^{**}$2/j. Thus, the synthetic $BiO_x$ (x=>1.7) provided by the invention may be deposited 25 to 35 times faster than $TiO_2$, which is a very significant economic advantage, especially in view of the fact that the refractive indices are essentially the same. Moreover, the enhanced speed of deposition of $BiO_x$ facilitates deposition of the oxide at the same web speed as deposition of the metal, thereby to provide for very economical production of the solar control films of the invention.

Taking into consideration production speed and the quality of coating desired, a preferred AR will fall within the range of 1.8 to 2.2

Auger profile measurements establish that the thin $BiO_x$ coating on the substrate is very uniform. Scanning electron microscope (SEM) photographs at a magnification of 50,000 times further reveal that as the OPP is increased to produce a $BiO_x$ film having an AR of 1.7 or greater, the surface of the coating becomes extremely smooth and uniform, thereby significantly reducing absorption and providing a film of high refractive index ideal for practice of the invention.

The invention thus provides for economical mass production of highly durable solar control films having low visual light transmission and low visual light reflection.

The objects and advantages of the invention have therefore been shown to be attained in a convenient, economical and practical manner.

While preferred embodiments of the invention have been herein illustrated and described, it is to be appreciated that various changes, rearrangements and modifications may be made therein without departing from the scope of the invention, as defined by the appended claims.

What is claimed is:

1. A solar control film having low visible light transmittance and low visible light reflectance comprising.
   a first sheet of transparent substrate material having thereon a thin, incoherent, transparent film of metal effective to partially block visible light transmittance and having a preselected low visible light reflectance,
   a second sheet of transparent substrate material having thereon a thin, incoherent, transparent film of metal effective to partially block visible light transmittance and having a preselected low visible light reflectance, and
   a layer of adhesive bonding said first and second sheets to one another with the films of metal facing one another and separated and optically decoupled from one another,
   the bonded sheets forming a composite film having a combined visible light transmittance blocking effect equal approximately to the sum of the blocking effects of the incoherent films and visible light reflectance substantially equal to the visible light reflectance of just one of the incoherent films, the visible light reflectance of each incoherent film being such that the visible light reflectance of the composite film does not exceed about 12% when visible light transmittance is about 50% or less, does not exceed about 15% when visible light transmittance is about 35% or less and does not exceed about 20% when visible light transmittance is about 25% or less.

2. A solar control film as set forth in claim 1 wherein at least one of said sheets of substrate material bears a layer of material of high refractive index between the substrate and the incoherent film of metal for further controlling the visible light transmittance and visible light reflectance of the composite film.

3. A solar control film as set forth in claim 2 wherein the material of high refractive index is selected from silicon nitride, the oxides of chromium, niobium and titanium, and a synthesized oxide of bismuth having an atomic ratio of oxygen to bismuth of from about 1.7 to about 2.5.

4. A solar control film as set forth in claim 1 wherein the thin incoherent metal film is selected from gold, silver, nickel, chromium and alloys thereof and stainless steel.

5. A solar control film as set forth in claim 1 including a third sheet of transparent substrate material having thereon a thin, incoherent, transparent film of metal effective to partially block visible light transmittance and having substantially the same low visible light reflectance as the other incoherent films, said third sheet being sandwiched between and physically bonded to said first and second sheets with the incoherent film of metal thereon separated from and optically decoupled from the incoherent films of metal on said first and second sheets.

6. A solar control film as set forth in claim 5 wherein one, two or all of said sheets of substrate material bears a layer of material of high refractive index between the substrate and the incoherent film of metal for further controlling the visible light transmittance and visible light reflectance of the composite film.

7. A solar control film as set forth in claim 1 including a layer of pressure sensitive adhesive on one side of the composite film for bonding the same to a window and a protective coating on the other side of the composite film for protecting the film from damage.

8. A solar control film having low visible light transmittance and low visible light reflectance comprising
   a first sheet of transparent substrate material bearing thereon a thin transparent layer of a material of high refractive index and a thin, transparent, incoherent coating of metal overlying the material of high refractive index, the metal film being effective to partially block visible light transmittance through the coated substrate and having a preselected low visible light reflectance,
   a second sheet of transparent substrate material bearing thereon a thin transparent layer of a material of high refractive index and a thin, transparent, incoherent coating of metal overlying the material of high refractive index, the metal film being effective to partially block visible light transmittance through the coated substrate and having a preselected low visible light reflectance, and
   a layer of adhesive bonding said first and second sheets to one another with the films of metal facing one another and optically decoupled and separated from one another,
   the bonded sheets forming a composite film having a combined visible light transmittance blocking effect equal approximately to the sum of the blocking effects of the incoherent films and low visible light reflectance substantially equal to the visible light reflectance of just one of the incoherent films, the visible light reflectance of each incoherent film being such that the visible light reflectance of the composite film does not exceed about 20% when visible light transmittance is no greater than about 25%, does not exceed about 15% when visible light transmittance is no greater than about 35% and does not exceed about 12% when visible light transmittance is up to about 50%.

9. A solar control film as set forth in claim 8 including a third sheet of transparent substrate material bearing thereon a thin, incoherent, transparent coating of metal effective to partially block visible light transmittance through the coated substrate and having substantially the same low visible light reflectance as the other incoherent films, said third sheet being sandwiched between and physically bonded to said first and second sheets with the incoherent film of metal thereon separated and optically decoupled from the incoherent films of metal on said first and second sheets.

10. A solar control film as set forth in claim 8 wherein the material of high refractive index comprises a synthesized oxide of bismuth reactively sputter deposited on the substrate material and having an atomic ratio of oxygen to bismuth of from 1.7 to 2.5.

11. A solar control film as set forth in claim 8 wherein the material of high refractive index is selected from the oxides of chromium, niobium and titanium and silicon nitride.

12. A method of making solar control films having low visible light transmittance and low visible light reflectance comprising the steps of depositing onto a transparent substrate a thin, incoherent, transparent coating of metal that is effective to partially block visible light transmittance through the coated substrate and that is sufficiently thin and incoherent as to have a preselected low visible light reflectance, assembling into a composite film a plurality of the coated substrates such that the incoherent metal coatings face one another internally of the composite film and are separated and optically decoupled from one another and such that the metal coatings together provide a combined visible light blocking effect sufficient to provide a preselected low level of visible light transmittance through the composite film, and laminating the coated substrates to one another to provide a composite film having a combined visible light transmittance blocking effect equal approximately to the sum of the blocking effects of the incoherent metal coatings and low visible light reflectance substantially equal to the visible light reflectance of just one of the incoherent metal coatings, the visible light reflectance of each incoherent metal coating being such that the visible light reflectance of the composite film does not exceed about 20% when visible light transmittance is no greater than about 25%, does not exceed about 15% when visible light transmittance is no greater than about 35% and does not exceed about 12% when visible light. transmittance is up to about 50%.

13. A method as set forth in claim 12 wherein the coated substrates are laminated to one another and are separated and optically decoupled from one another by means of one or more interleaved layers of adhesive.

14. A method as set forth in claim 12 including the step of first depositing onto the substrate a thin transparent layer of material of high refractive index and then depositing the metal coating onto the material of high refractive index.

15. A method as set forth in claim 14 wherein the material of high refractive index has a refractive index of at least 2.0.

16. A method as set forth in claim 12 including the step of reactively sputter depositing onto the substrate a synthesized oxide of bismuth having an atomic ratio of oxygen to bismuth of from 1.7 to 2.5, and then sputter depositing the thin coating of metal onto the synthesized bismuth oxide.

* * * * *

REEXAMINATION CERTIFICATE (3437th)

United States Patent [19]

Yang

[11] B1 5,513,040

[45] Certificate Issued Feb. 3, 1998

[54] OPTICAL DEVICE HAVING LOW VISUAL LIGHT TRANSMISSION AND LOW VISUAL LIGHT REFLECTION

[75] Inventor: Peter Y. Yang, San Diego, Calif.

[73] Assignee: Deposition Technologies, Inc., San Diego, Calif.

Reexamination Request:
No. 90/004,680, Jun. 27, 1997

Reexamination Certificate for:
Patent No.: 5,513,040
Issued: Apr. 30, 1996
Appl. No.: 332,922
Filed: Nov. 1, 1994

[51] Int. Cl.[6] .................. G02B 1/10; G02B 5/28; B21D 39/00; C03C 27/04
[52] U.S. Cl. .................. 359/585; 359/586; 428/622; 428/632
[58] Field of Search .................. 359/359, 360, 359/584, 585, 586, 589; 428/622, 632

[56] References Cited

U.S. PATENT DOCUMENTS

| | | | |
|---|---|---|---|
| 3,556,640 | 1/1971 | Austin | 359/585 |
| 4,045,125 | 8/1977 | Farges | 359/585 |
| 4,634,637 | 1/1987 | Oliver et al. | 428/622 |
| 4,797,317 | 1/1989 | Oliver et al. | 428/204 |
| 4,799,745 | 1/1989 | Meyer et al. | 359/360 |
| 4,978,181 | 12/1990 | Inanuma et al. | 359/360 |
| 5,071,206 | 12/1991 | Hood et al. | 359/360 |
| 5,306,547 | 4/1994 | Hood et al. | 359/360 |

OTHER PUBLICATIONS

Floyd E. Woodard et al, PCT International Publication No. WO 94/04356, Mar. 1994.

*Primary Examiner*—Jon W. Henry

[57] ABSTRACT

A solar control film having low visible light transmittance and low visible light reflectance is comprised of two or more transparent substrates each bearing a thin, transparent, discontinuous, incoherent film of metal having low visible light reflectance and a degree of visible light blocking capacity, the substrates being so assembled and laminated into a composite that the visible light blocking capacities of the metal films are effectively combined to provide a composite having low visible light transmittance. Performance characteristics are enhanced by providing on one or more of the substrates a transparent coating of high refractive index underlying the metal film. The material of high refractive index is preferably a synthetic high oxygen content oxide of bismuth, which facilitates efficient and economical production of the solar control film.

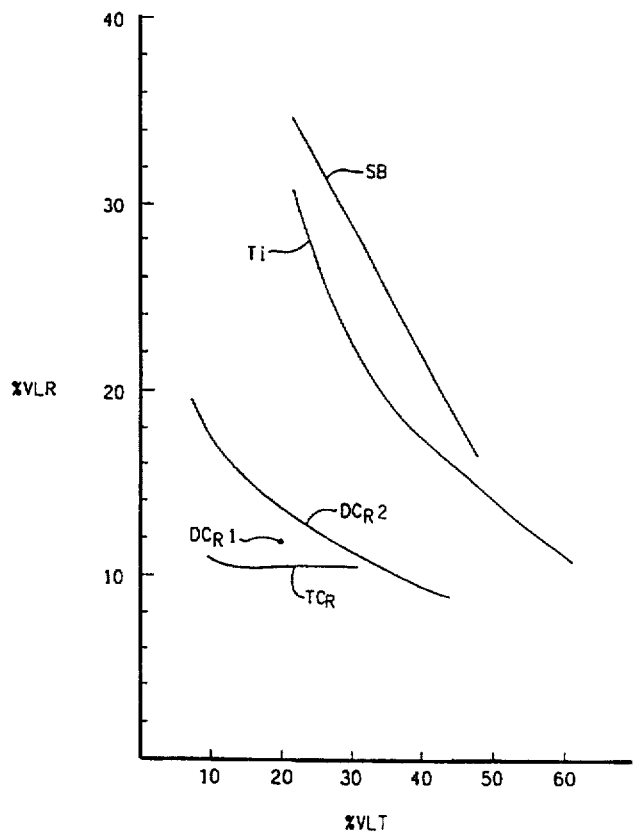

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–16 is confirmed.

* * * * *